(12) United States Patent
Thornton

(10) Patent No.: US 6,421,393 B1
(45) Date of Patent: Jul. 16, 2002

(54) TECHNIQUE TO TRANSFER MULTIPLE DATA STREAMS OVER A WIRE OR WIRELESS MEDIUM

(75) Inventor: Barry Thornton, Austin, TX (US)

(73) Assignee: Clearcube Technology, Inc., Austin, TX (US)

(*) Notice: Subject to any disclaimer, the term of this patent is extended or adjusted under 35 U.S.C. 154(b) by 0 days.

(21) Appl. No.: 09/172,809

(22) Filed: Oct. 15, 1998

Related U.S. Application Data

(60) Provisional application No. 60/062,199, filed on Oct. 16, 1997.

(51) Int. Cl.[7] .................. H04L 27/00; H04L 27/04; H04L 27/06; H03H 7/30
(52) U.S. Cl. .................. 375/259; 375/295; 375/316; 375/229
(58) Field of Search .................. 375/256, 257, 375/259, 295, 316, 359, 360, 355, 276, 340, 305, 336, 268, 300, 320, 229; 333/18, 28 R

(56) References Cited

U.S. PATENT DOCUMENTS

| | | | |
|---|---|---|---|
| 4,219,784 A | * | 8/1980 | Detering .................. 327/7 |
| 4,547,733 A | | 10/1985 | Thoraval |
| 4,658,224 A | | 4/1987 | Thylen et al. |
| 4,698,603 A | | 10/1987 | Clarius |
| 4,998,244 A | | 3/1991 | Lee et al. |
| 5,404,379 A | | 4/1995 | Shyue et al. |
| 5,425,060 A | | 6/1995 | Roberts et al. |
| 5,450,032 A | | 9/1995 | Mimura et al. |
| 5,461,411 A | | 10/1995 | Florence et al. |
| 5,500,879 A | | 3/1996 | Webster et al. |
| 5,508,711 A | | 4/1996 | Okada |
| 5,513,214 A | | 4/1996 | Gozzo |
| 5,517,213 A | | 5/1996 | Bhatt et al. |
| 5,528,633 A | | 6/1996 | Halik et al. |
| 5,530,682 A | | 6/1996 | Brosow |
| 5,550,596 A | | 8/1996 | Strolle et al. |
| 5,627,558 A | | 5/1997 | Hotto |
| 5,633,895 A | | 5/1997 | Powell, II et al. |
| 5,675,609 A | * | 10/1997 | Johnson .................. 329/311 |
| 5,726,609 A | | 3/1998 | Lindholm |
| 5,767,751 A | | 6/1998 | Magnusson |
| 5,943,177 A | * | 8/1999 | Mathews et al. .................. 360/32 |

FOREIGN PATENT DOCUMENTS

| | | | |
|---|---|---|---|
| WO | WO00/19808 | * | 4/1999 |

* cited by examiner

Primary Examiner—Tesfaldet Bocure
(74) Attorney, Agent, or Firm—Conley, Rose & Tayon PC

(57) ABSTRACT

A method and system for combining multiple individual asynchronous data streams for simultaneous transmission in the analog domain via a single conductor or wireless transmission medium. In one embodiment, a carrier signal is modulated and demodulated on a half-cycle basis. Each half-cycle is amplitude modulated (i.e., multiplied) by a fixed value representative of the data to be encoded that is applied to the half-cycle at zero-crossing and is held steady for the duration of the half-cycle. In this manner, each half-cycle of a carrier signal is modulated to contain data. For purposes of redundancy or security, two or more half-cycles may be used to contain the data, but in each case, the modulation still occurs on a half-cycle basis.

15 Claims, 3 Drawing Sheets

TECHNIQUE TO TRANSFER MULTIPLE DATA STREAMS OVER A WIRE OR WIRELESS MEDIUM

CROSS-REFERENCE TO RELATED APPLICATIONS

This application claims the benefit of U.S. Provisional Patent Application Serial No. 60/062,199, filed on Oct. 16, 1997, which is hereby incorporated by reference in its entirety.

TECHNICAL FIELD

The invention relates generally to data transmission techniques and, more particularly, to a method and system for combining multiple individual asynchronous data streams for simultaneous transmission via a single conductor or wireless transmission medium.

BACKGROUND OF THE INVENTION

There are at least two known techniques for achieving the transmission of multiple data streams in a single medium. The first is "time domain multiplexing", or "TDM", in which each of the multiple individual data streams to be combined is sampled and assigned a specific timed space in a new data stream. This new data stream must also include some form of synchronization information that serves to identify the beginning of the data packages.

TDM requires that the new data stream be faster than any of the individual data streams being multiplexed. Typically, the data sampling rate is eight to ten times that of the highest speed data stream to be sampled to reduce the jitter or time errors incurred during the sampling process. Synchronicity must also be addressed. Specifically, the addition of overhead for the synchronization information runs the bandwidth of the new data stream to a much higher rate than any of the individual data streams. Moreover, prudent following of the Nyquist sampling requirements would suggest that the actual individual sampling rate for any data stream must be twice that of the sampled data stream, putting the actual data rate to as much as 24 times the highest individual rate (ten channels, two bits for sync, two times over-sampling).

TDM is illustrated in FIG. 1. FIG. 1 illustrates a sequential series of sampled data bits numbered 1 through 10. Two additional bits of data space are employed as a synchronization ("sync") signal. Synchronization is usually accomplished using a special bit format that is clearly not data. This violation of the data convention obviously isolates the synchronization event. As shown in FIG. 1, ten samples became twelve bits. Assuming a data rate of 10 Mbits/second, the new data stream is at 120 Mbits/second (12*10 Mbits/second). Two bits equal a hertz, making the signal a 60 MHZ rates. Assuming a ten-to-one bandwidth requirement to send square waves results in a 600 MHZ bandwidth requirement to transfer the ten channels.

The second technique is known as frequency domain multiplexing ("FDM"), in which each individual data stream to be combined is used to modulate a different individual carrier using either amplitude or frequency modulation. The modulated carriers are then transmitted in a manner similar to that used by individual radio stations in making transmissions. As illustrated in FIG. 2, this technique requires that the total bandwidth be sufficiently wide to accommodate the sum of the carriers and their respective data-bearing sidebands.

Clearly, FDM also poses a bandwidth problem. In particular, the two primary issues that must be addressed are the selection of an appropriate frequency for the modulating carrier to provide clean sidebands of modulated signal, and the actual width of the sidebands. Referring again to FIG. 2, using the same data assumptions as the TDM example described with reference to FIG. 1, ten channels of 10 Mbits each would require using 20 MHZ of bandwidth for each data-carrying sideband. Adding 5 MHZ for a guard band between each of the channels and approximately 35 MHZ of start frequency results in a bandwidth of approximately 270 MHZ for the 10 channels.

It is apparent that the primary disadvantage of both of the techniques described above is the large bandwidth needed to transmit the signals. With TDM, the bandwidth requirement is due to the data sampling process itself and the overhead required for synchronization in the demultiplexing process. With FDM, the bandwidth requirement is due to the spectrum spread needed for the individual carriers and their respective sidebands.

Additional disadvantages associated with TDM include the fact that some form for sampling synchronization must exist with the data. If the data itself is not synchronous with the sampling clock, then some additional circuitry must be employed to convert the asynchronous data to synchronous. Typically, this would be through the use of FIFOs or active memory and a reclocking scheme. Clearly, implementation of TDM is costly and complex.

FDM suffers from the same disadvantages associated with TDM, as described above.

The deficiencies of TDM and FDM can be summarized as follows:

1. a limited amount of digital data can be transferred in a given bandwidth;
2. wide bandwidth is required to achieve high digital data transfer rates;
3. the cost in materials, space, heat, and power required to transfer the data is great;
4. the distance that the data can be transferred is limited;
5. the quality and age of the medium infrastructure can negatively affect the data; and
6. external noise can negatively affect the data.

Therefore, what is needed is a technique for combining multiple asynchronous data signals in a minimum of bandwidth.

SUMMARY OF THE INVENTION

In a preferred embodiment, the invention is a method and system for combining multiple individual asynchronous data streams for simultaneous transmission in the analog domain via a single conductor or wireless transmission medium.

In one embodiment, a carrier signal is modulated and demodulated on a half-cycle basis. Each half-cycle is amplitude modulated (i.e., multiplied) by a fixed value representative of the data to be encoded that is applied to the half-cycle at zero-crossing and is held steady for the duration of the half-cycle. In this manner, each half-cycle of a carrier signal is modulated to contain data. For purposes of redundancy or security, two or more half-cycles may be used to contain the data, but in each case, the modulation still occurs on a half-cycle basis.

As previously indicated, the actual change in the modulation must occur at the zero-crossing point of the carrier, such that the carrier has, for the half-cycle, its level set by a constant rather than by a signal whose amplitude changes over the time of the half-cycle.

A technical advantage achieved with the invention is that multiple digital data signals may be combined and transmitted in the analog domain.

Another technical advantage achieved with the invention is that the bandwidth of the data encoded and transferred using the method and system of the invention is considerably smaller than that of data encoded using TDM or FDM.

Yet another technical advantage achieved with the invention is that it is implemented using considerably simpler and less expensive circuitry for the data rates handled.

DETAILED DESCRIPTION OF THE PREFERRED EMBODIMENT

Figure 1:
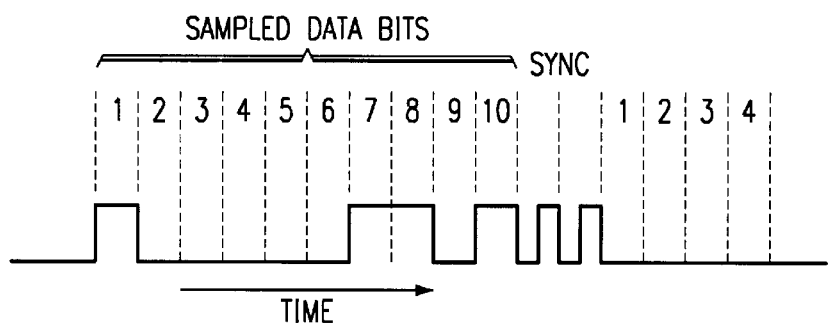
FIGS. 1 and 2 respectively illustrate prior art techniques for transmitting multiple data streams via a single medium.
Figure 2:
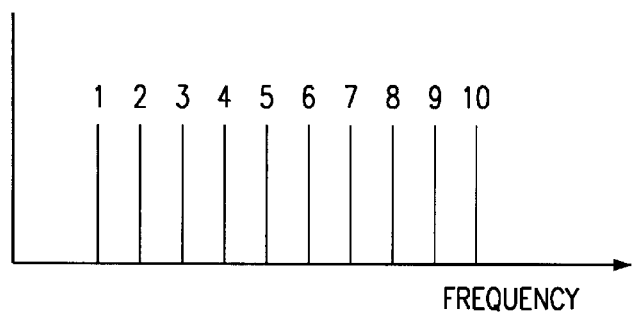

FIGS. 1 and 2 illustrate prior art techniques for achieving the transmission of multiple data streams via a single transmission medium, as described above.

Figure 3:
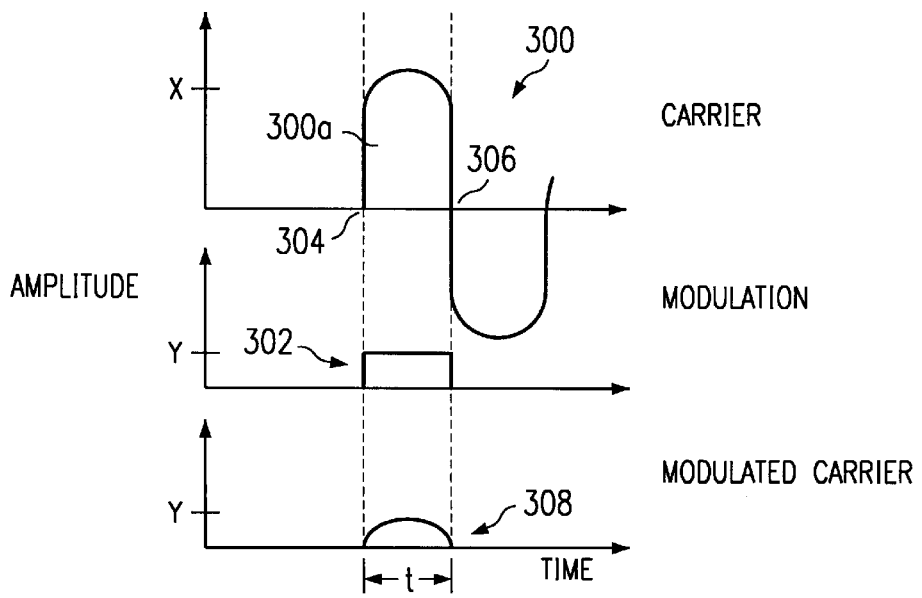
FIGS. 3 and 4 illustrate one embodiment of the technique of the present invention for transmitting multiple data streams via a single medium.

The present invention will now be described with reference to FIGS. 3–8. In accordance with the features of the present invention, a carrier signal is modulated and demodulated on a half-cycle basis. In this process, each half-cycle is amplitude modulated (multiplied) by a fixed value that is applied to the half-cycle at zero-crossing and is held steady for the duration of the half-cycle. This technique is illustrated in FIG. 3. As shown in FIG. 3, a half-cycle 300*a* of a carrier 300 is modulated by a modulation signal 302 the level of which is established just at the zero-crossing point 304 of the carrier 300 and is maintained until the half-cycle 300*a* is finished at a point 306. In other words, each half-cycle of the carrier 300, such as the half-cycle 300*a*, and the modulation signal 302 have a length "t". The result of the modulation of the carrier 300 by the modulation signal 302 is a modulated carrier signal 308.

Figure 4:
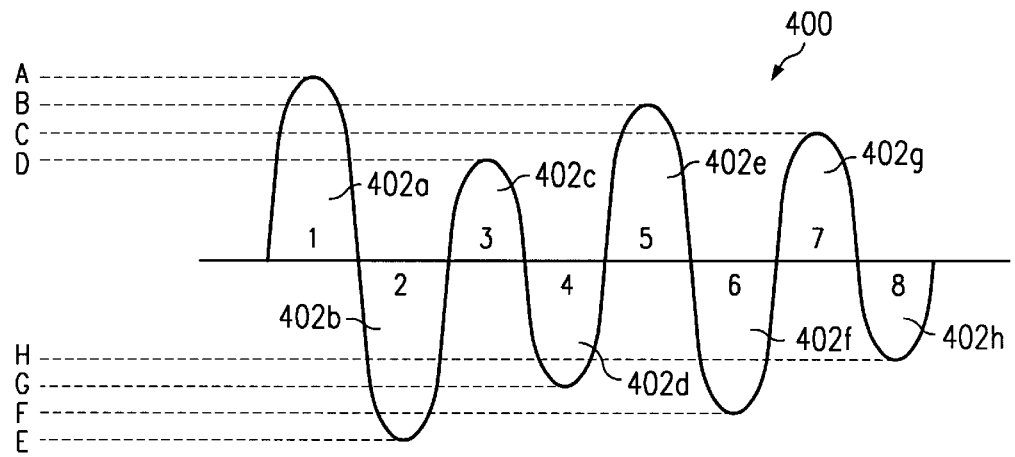

Each half-cycle of the carrier 300 is modulated in this manner to contain data. For purposes of redundancy, two or more half-cycles may be used to contain such data, but in each case, the modulation still occurs on a half-cycle basis. Such a modulated carrier is illustrated in FIG. 4, which illustrates a modulated carrier signal 400 comprising eight (8) half-cycle elements, respectively designated 402*a*–402*h*, each of which has a different amplitude. In the example illustrated in FIG. 4, only four data states (A–D) are defined. These same four data states appear on the negative half-cycles as E–H, respectively. While inverted in polarity, these are the same states as far as both modulation and detection are concerned.

Figure 5:
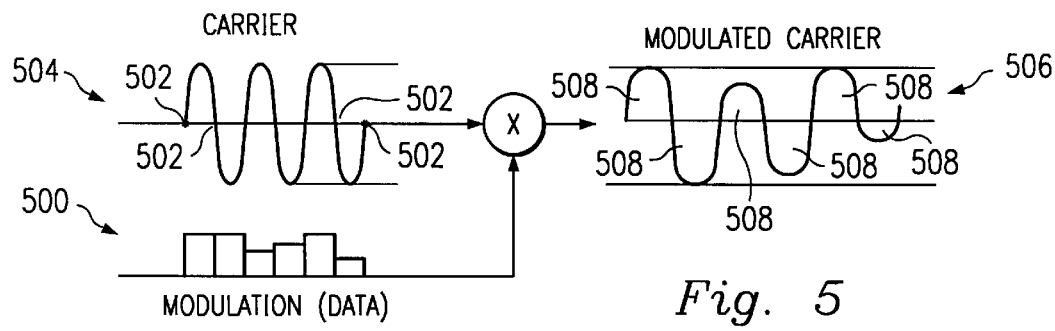
FIG. 5 is a schematic diagram of the construction of the signal shown in FIGS. 3 and 4.

Construction of a modulated carrier signal such as that shown in FIG. 4 will now be described in greater detail with reference to FIG. 5. As previously indicated, the actual changes in the level of modulation signal, represented in FIG. 5 by a data stream 500, must occur at zero crossing points 502 of a carrier signal 504. As a result, a modulated carrier signal 506 has, for each half-cycle 508, its level set by a constant rather than by a signal whose amplitude changes over the time of the half-cycle.

Figure 5A:
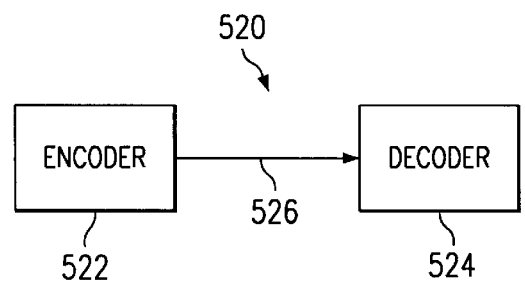
FIG. 5A is a schematic block diagram of a transmission system embodying features of the present invention and comprising an encoder and a decoder.

FIG. 5A illustrates a transmission system 520 embodying feature of the present invention. The transmission system 520 includes an encoder 522, described in further detail in connection with FIG. 6, and a decoder 524, described in further detail in connection with FIG. 7. As may be further seen in Fig. 5A, a transmission medium 526 couples an output of the encoder 522 to an input of the decoder 524. In alternate embodiments of the invention, the transmission medium may be a wireline medium, for example, a cable, or a wireless medium.

Figure 6:
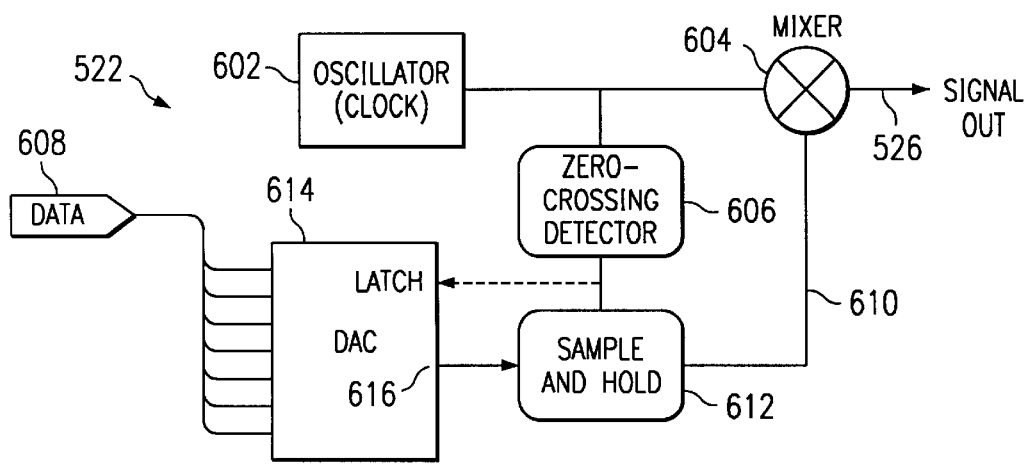
FIG. 6 is a schematic block diagram of the encoder of FIG. 5A.

A modulated carrier signal generated as described above possesses considerable data transfer efficiency and is self-clocking, as the signal itself is also the clock. FIG. 6 illustrates the encoder 522, embodied as an amplitude domain modulation ("ADM") generator. An oscillator (clock) 602 generates a sine wave or some other low harmonic content signal, which is directly input to a mixer or multiplier 604. The signal output from the oscillator 602 is also input to a zero crossing detector circuit 606, which generates a gating signal for data 608 input to the encoder 522 as a data stream. In the embodiment of the invention disclosed herein, it is contemplated that the data 608 is in digital form. However, as the signal input to the mixer 604 on line 610 must be in analog form, in the disclosed embodiment, a digital-to-analog converter ("DAC") 614 is coupled to receive the data 608 which, in this embodiment, is a digital data stream. In an alternate embodiment of the invention not illustrated in the drawings, the data 608 is in analog form. Of course, in this embodiment, the DAC 614 may be omitted and the data 608 directly coupled to sample and hold circuit 612.

The DAC 614 converts the input digital data stream to analog and place the converted data on line 616. The data, which is now in the form of an analog signal on line 616, is fed to the mixer 604 by sample and hold circuit 612 over the line 610 as a DC or steady-state control signal for the duration of the clock half-cycle. More specifically, for the duration of each clock half-cycle, the sample and hold circuit 612 holds the analog signal input thereto via the line 616 at a fixed level which preferably corresponds to the signal level at the initial zero-crossing point for that half-cycle and transmits the resultant signal to the mixer 616 over the line 610. Of course, in an alternate embodiment of the invention, shown in phantom in FIG. 6, the sample and hold circuit 612 may be omitted and the line 616 may be directly coupled to the mixer 604 if the zero crossing detector 606 is used to latch the output 616 of the DAC 614 at the fixed level which corresponds to the signal level at the initial zero-crossing point for each half-cycle. Assuming the data 608 input to the encoder 522 can be represented by the waveform 500 (FIG. 5), the output of the encoder 522 ("Signal Out"), which is also the output of the mixer 604, to be placed on the transmission medium 526 may be represented by the waveform 506 (FIG. 5).

Figure 7:
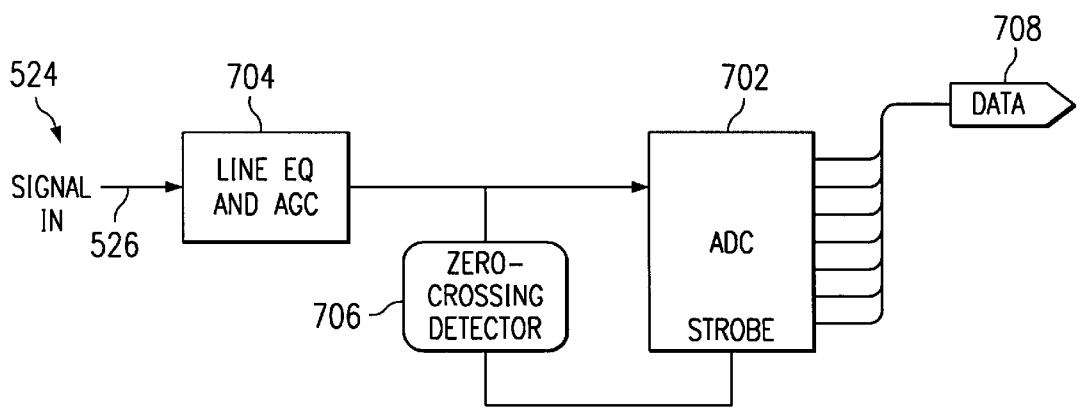
FIG. 7 is a schematic block diagram of the decoder of FIG. 5A.

Referring now to FIG. 7, demodulation of a modulated carrier signal output from the encoder 522 and received over the transmission medium 526 is performed by the decoder 524. As shown in FIG. 7, an analog-to-digital converter ("ADC") 702 is timed to read the peak (either positive or negative) of the received modulated carrier signal. In particular, the incoming modulated carrier signal is equalized for cable high frequency attenuation and overall signal gain by a circuit 704. The now normalized input signal is input to both a zero crossing detector 706 and the ADC 702. It is anticipated that enough delay has been added to the detector 706 that the ADC 702 will be gated to sample on the peak of the incoming modulated carrier signal. The digital data 708 output of the ADC 702 will be the data originally input to the encoder 522. Assuming the data ("Signal In") input to the decoder 524 can be represented by the waveform 522 (FIG. 5), the data 708 output from the decoder 524 may be represented the waveform 500 (FIG. 5).

Figure 8:
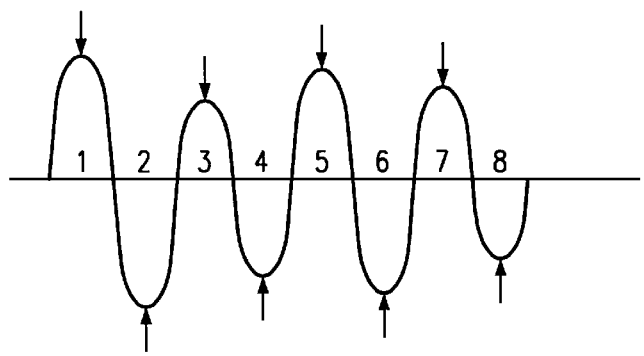
FIG. 8 illustrates the sampling points for the signal recovery.

FIG. 8 illustrates the sampling points for the signal recovery described above with reference to FIG. 7. These points an be determined by either the zero-crossing method described above or a detector based on the derivative of the slope of the curve passing through zero. It will be recognized that each half-cycle can represent a finite number of data states. This number is set by the resolution of the cable system as restricted by the bandwidth and noise level of the link. Typically, data is represented in combinations set forth in the following table:

TABLE I

| Data0 | Data1 | Data2 | Level |
|---|---|---|---|
| 0 | 0 | 0 | 30% |
| 1 | 0 | 0 | 40% |
| 0 | 1 | 0 | 50% |
| 0 | 0 | 1 | 60% |
| 1 | 1 | 0 | 70% |
| 1 | 0 | 1 | 80% |
| 0 | 1 | 1 | 90% |
| 1 | 1 | 1 | 100% |

Table I

Table I above illustrates the method of compacting data for the proposed modulation technique. Here, three data channels (Data0, Data1, and Data2) are represented. If the amplitude of the modulation carrier signal is 30% or less of the maximum signal (defined by Data0, Data1, and Data2 all being high (1)), then Data0, Data1 and Data2 are low (0). If the amplitude was 70%, then Data0 and Data1 must be high (1) and Data2 must be low (0). Using such a process, large amounts of data can be carried in the transmitted signal.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. An encoder for encoding a data stream as an analog signal, the encoder comprising:

an oscillator for outputting a clock signal;

means connected to receive said clock signal from said oscillator for detecting zero-crossing points of said clock signal and generating a gating signal indicative of each of said zero-crossing points, wherein said zero-crossing points indicate respective half-cycles of said clock signal; and means for combining said clock signal with a signal produced from said data stream and outputting said combined signal via a transmission medium;

wherein said combining comprises modulating half-cycles of said clock signal with corresponding values of said data stream, wherein said values are determined based on said zero-crossing points.

2. The encoder of claim 1 further comprising a sample and hold circuit connected to receive said data stream and producing said signal provided to said means for combining.

3. The encoder of claim 1 wherein said clock signal comprises a sine wave.

4. The encoder of claim 1 wherein said transmission medium comprises a cable.

5. The encoder of claim 1 wherein said transmission medium comprises a wireless medium.

6. The encoder of claim 2 wherein said data stream is a digital data stream and further comprising a digital-to-analog converter ("DAC") for converting said digital data stream to an analog signal, said sample and hold circuit connected to receive said analog signal output said DAC.

7. A decoder for decoding a data signal encoded as an analog signal received via a transmission medium, the decoder comprising:

a circuit for equalizing said encoded digital data signal for high frequency attenuation and overall signal gain; and a circuit connected to an output of said equalizing circuit for detecting zero-crossing points of a signal output from said equalizing circuit and outputting a signal indicative of each of said zero-crossing points.

8. The decoder of claim 7 wherein said data signal is a digital data signal and wherein the decoder further comprises:

an analog-to-digital converter ("ADC") having a first input for receiving said signal output from said equalizing circuit and a strobe input for receiving a signal output from said zero-crossing detector circuit, wherein an output of said ADC comprises said digital data signal.

9. The decoder of claim 7 wherein said transmission medium is a cable.

10. The decoder of claim 7 wherein said transmission medium is a wireless medium.

11. A transmission system for enabling transmission of a digital data signal via a transmission medium, the transmission system comprising:

an encoder connected to said transmission medium, the encoder comprising:

an oscillator for outputting a clock signal;

a digital-to-analog converter ("DAC") for converting a digital data signal to an analog signal;

means connected to receive said clock signal from said oscillator for detecting zero-crossing points of said clock signal and generating a gating signal indicative of each of said zero-crossing points to said DAC, wherein said zero-crossing points indicate respective half-cycles of said clock signal; and means for combining said clock signal with a signal output from said DAC and outputting said combined signal via a transmission medium;

wherein said combining comprises modulating half-cycles of said clock signal with corresponding values of said data signal, wherein said values are determined based on said zero-crossing points; and a decoder connected to said transmission medium, the decoder comprising:

a circuit for equalizing said encoded digital data signal for high frequency attenuation and overall signal gain;

a circuit connected to an output of said equalizing circuit for detecting zero-crossing points of a signal output from said equalizing circuit and outputting a signal indicative of each of said zero-crossing points; and an analog-to-digital converter ("ADC") having a first input for receiving said signal output from said equalizing circuit and a strobe input for receiving a signal output from said zero-crossing detector circuit, wherein an output of said ADC comprises said digital data signal.

12. The transmission system of claim 11 wherein said encoder further comprises a sample and hold circuit connected to receive said signal output from said DAC before said signal is provided to said means for combining.

13. The transmission system of claim 11 wherein said clock signal comprises a sine wave.

14. The transmission system of claim 11 wherein said transmission medium comprises a cable.

15. The transmission system of claim 11 wherein said transmission medium comprises a wireless medium.

* * * * *